US009201762B1

(12) United States Patent
Chen

(10) Patent No.: US 9,201,762 B1
(45) Date of Patent: Dec. 1, 2015

(54) PROCESSOR IMPLEMENTED SYSTEMS AND METHODS FOR REVERSIBLE DEBUGGING USING A REPLICATE PROCESS SYSTEM CALL

(75) Inventor: Xiaoyan Chen, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 877 days.

(21) Appl. No.: 13/091,491

(22) Filed: Apr. 21, 2011

Related U.S. Application Data

(60) Provisional application No. 61/326,522, filed on Apr. 21, 2010.

(51) Int. Cl.
*G06F 9/44* (2006.01)
*G06F 11/36* (2006.01)

(52) U.S. Cl.
CPC .................................. *G06F 11/3664* (2013.01)

(58) Field of Classification Search
USPC .......................................................... 717/125
See application file for complete search history.

(56) References Cited

U.S. PATENT DOCUMENTS

| | | | | |
|---|---|---|---|---|
| 6,427,232 | B1 * | 7/2002 | Ku et al. | 717/124 |
| 2004/0040013 | A1 * | 2/2004 | Kalra | 717/129 |
| 2006/0206885 | A1 * | 9/2006 | Seidman et al. | 717/148 |
| 2008/0155342 | A1 * | 6/2008 | O'Callahan | 714/38 |
| 2008/0244325 | A1 * | 10/2008 | Tyulenev | 714/38 |
| 2008/0295114 | A1 * | 11/2008 | Argade et al. | 719/320 |
| 2011/0138366 | A1 * | 6/2011 | Wintergerst et al. | 717/130 |
| 2011/0214109 | A1 * | 9/2011 | Pedersen | 717/128 |

* cited by examiner

*Primary Examiner* — Li B Zhen
*Assistant Examiner* — Sen Chen

(57) ABSTRACT

Systems and methods are provided for debugging program code. Program code is executed in a process. Clone processes of the process are generated at predetermined time intervals to capture states of execution of the program code at the predetermined time intervals. State data is extracted from the clone processes to generate snapshots of execution of the program code at the predetermined time intervals. A display of the snapshots is provided for debugging the program code, where the snapshots include the extracted state data from the clone processes generated at the predetermined time.

20 Claims, 11 Drawing Sheets

PROCESSOR IMPLEMENTED SYSTEMS AND METHODS FOR REVERSIBLE DEBUGGING USING A REPLICATE PROCESS SYSTEM CALL

CROSS-REFERENCE TO RELATED APPLICATIONS

This application claims priority to U.S. Provisional Patent Application No. 61/326,522, filed Apr. 21, 2010, entitled "Reversible Debugging with Fork," the entirety of which is herein incorporated by reference.

FIELD

The technology described herein relates generally to program code debugging and more particularly to the use of a replicate process system call to enable reverse program code debugging.

BACKGROUND

Debugging is a methodical process of finding and reducing the number of bugs, or defects, in a computer program or a piece of electronic hardware, thus making it behave as expected. Debugging tends to be harder when various subsystems are tightly coupled, as changes in one system may cause bugs to emerge in another system.

FIG. 1 depicts an example of a prior art debugging application display. The debugging application display 102 provides user controls for stepping through a portion of program code to debug. The debugging application display 102 includes controls 104, 106, 108 for manipulating the pace of execution of the program code. A continue control 104 enables a user to command continued execution of the program code until a certain point in the program code is reached, an error condition is reached, or execution is completed. A step control 106 enables a user to command the next instruction of the program code be executed. A next instruction 108 enables a user to command continued execution of the program code until the next event is reached. The debugging application display 102 further provides an execution state information display 110. The execution state information display 110 may display a variety of data to a user including information regarding a current instruction being executed, a next instruction to be executed, contents of memory locations, and other data. Using the controls 104, 106, 108, the user can work through the execution of the program code at a desired pace to view execute state information to help identify any defects in the program code.

SUMMARY

Examples of systems and methods are provided for debugging program code. Program code is executed in a process. A replicate process system call is executed at predetermined time intervals to generate clone processes of the process to capture states of execution of the program code at the predetermined time intervals. State data is extracted from the clone processes to generate snapshots of execution of the program code at the predetermined time intervals. A display of the snapshots is provided for debugging the program code, where the snapshots include the extracted state data from the clone processes generated at the predetermined time intervals when replicate process system calls were executed.

As further examples, the replicate process system call may be a fork system call. The display may be configured to enable forward or backward browsing of the snapshots. A number of snapshots taken may be user-selected. A clone process may include registers that contain identical contents as registers of the process at one of the predetermined time intervals, virtual memory that contains identical contents as virtual memory of the process at one of the predetermined time intervals, and open files that contain identical contents as open files of the process at one of the predetermined time intervals.

As additional examples, the method may be executed using an application in an operating system wherein the replicate process system call is a fork system call that is a native operating system system call. The operating system is Unix or Linux. The predetermined time interval may be one second in length. The clone processes may not be generated for one or more states of the execution of the program. The method is executed in a non-virtual machine environment. The snapshot may include register contents, virtual memory contents, open files, signal handlers, blocked signals, parent information, and a thread group associated with the execution of the program at one of the predetermined time intervals.

As further examples, executing a replicate process system call may include generating a second process that mimics the current state of the execution of the program code in the process and continuing execution of the program code in the process. As another example, executing a replicate process system call may include generating a second process that mimics the current state of the execution of the program code in the process and continuing execution of the program code in the second process.

Further, a computer-implemented system for debugging program code may include one or more data processors and a computer-readable medium encoded with instructions for commanding the one or more data processors to execute a method. In the method, program code is executed in a process. A replicate process system call is executed at predetermined time intervals to generate clone processes of the process to capture states of execution of the program code at the predetermined time intervals. State data may be extracted from the clone processes to generate snapshots of execution of the program code at the predetermined time intervals. A display of the snapshots is provided for debugging the program code, where the snapshots include the extracted state data from the clone processes generated at the predetermined time intervals when replicate process system calls were executed.

As another example, a computer readable medium is encoded with instructions for commanding one or more data processors for executing a method of debugging program code. In the method, program code is executed in a process. A replicate process system call is executed at predetermined time intervals to generate clone processes of the process to capture states of execution of the program code at the predetermined time intervals. State data is extracted from the clone processes to generate snapshots of execution of the program code at the predetermined time intervals. A display of the snapshots is provided for debugging the program code, where the snapshots include the extracted state data from the clone processes generated at the predetermined time intervals when replicate process system calls were executed.

In another example, a computer-implemented method of debugging program code may include instrumenting program code to execute a replicate process system call at predetermined time intervals during execution of the program code. The replicate process system call may generate a clone process of a current state of execution of the program at the predetermined time intervals. State data is extracted from the clone processes to generate snapshots of the states of execution of the program code at the predetermined time intervals.

A display of the snapshots is provided for debugging the program code, wherein the snapshots include the captured state data from the clone processes generated at the predetermined time intervals when the replicate process system calls were executed.

DETAILED DESCRIPTION

Figure 1:
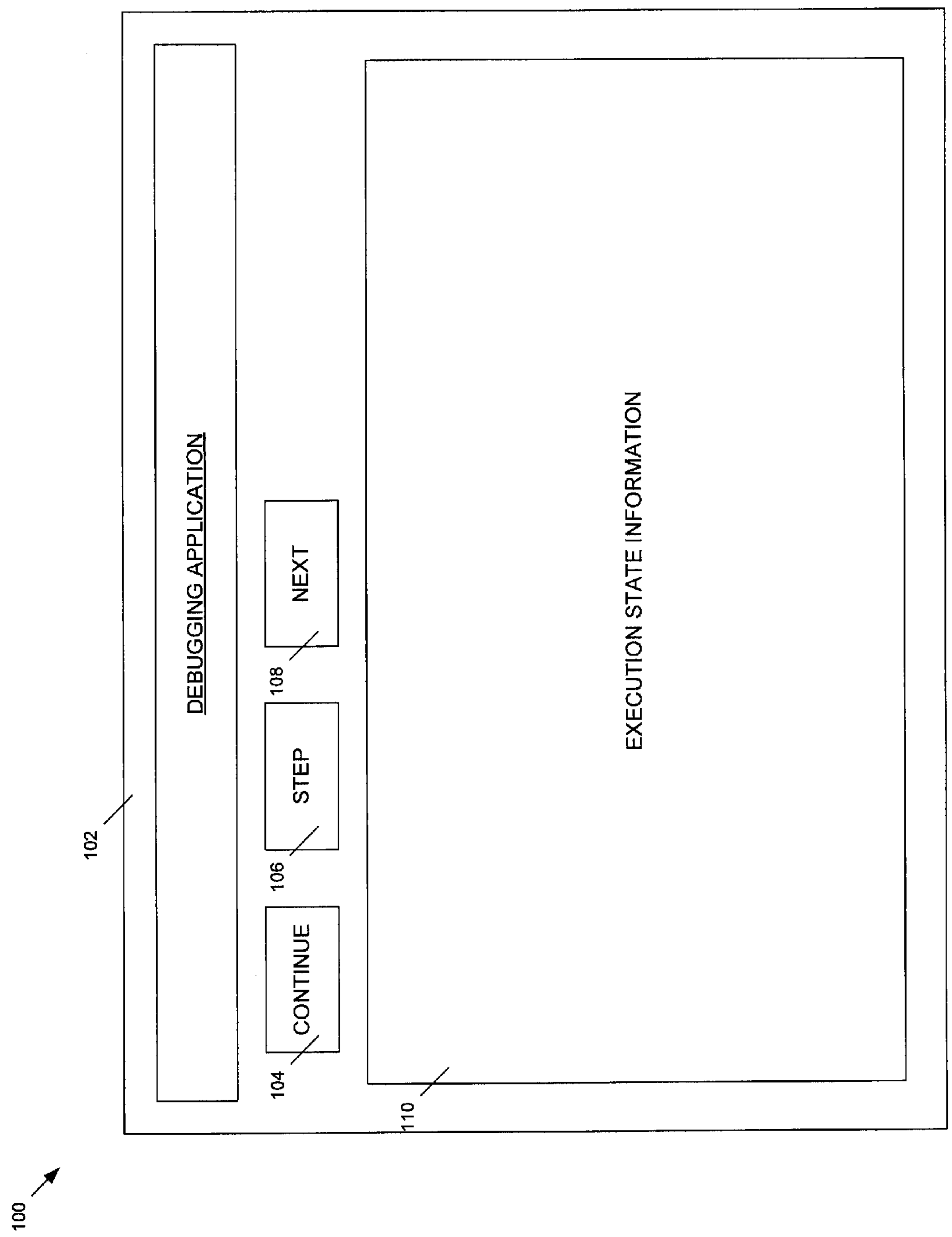
FIG. 1 depicts an example of a prior art debugging application display.
Figure 2:
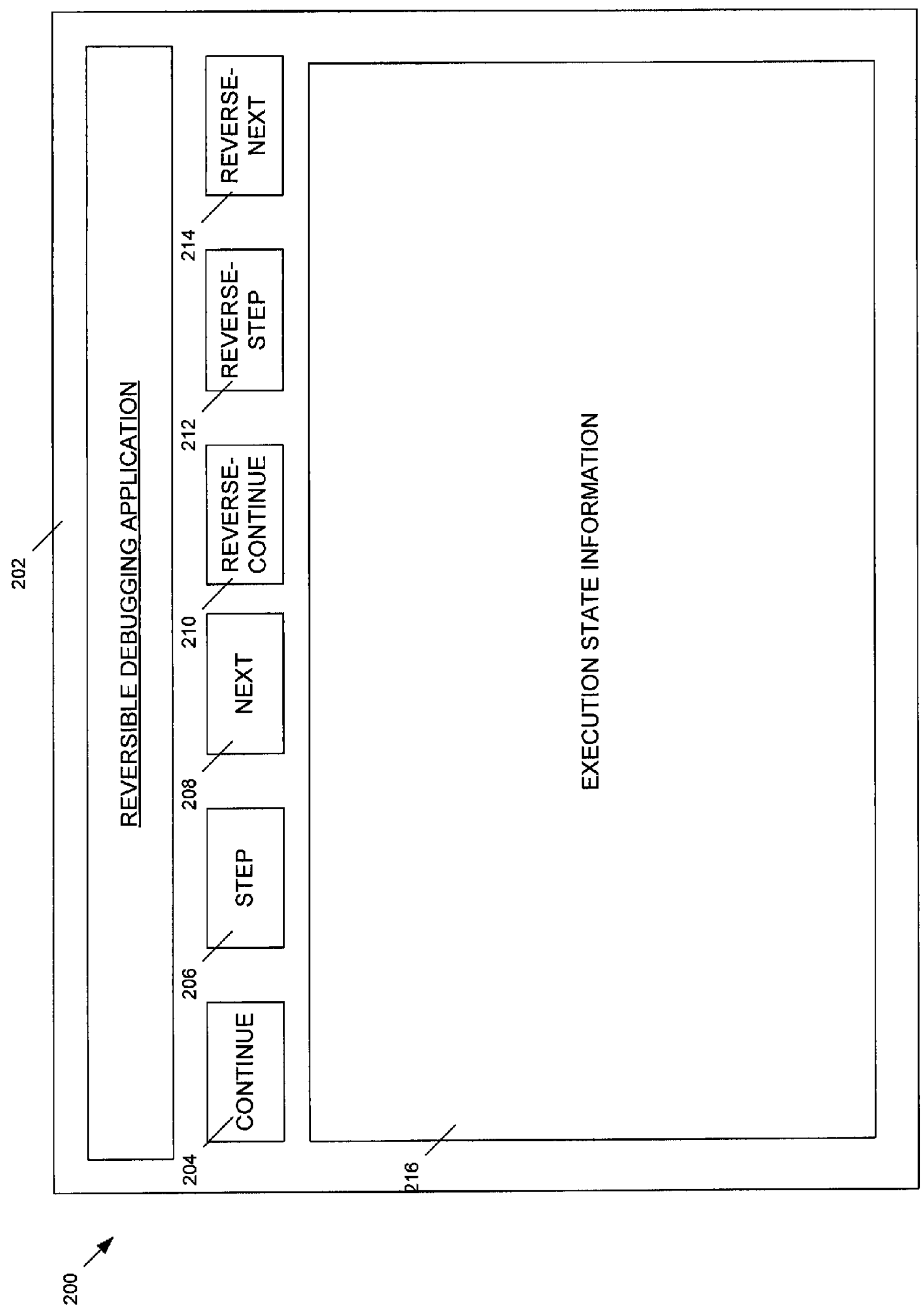
FIG. 2 depicts a reversible debugging application display.

FIG. 2 depicts a reversible debugging application display. The reversible debugging application display 202 offers certain features similar to those shown in the debugging application display of FIG. 1. For example, the reversible debugging application display 202 offers controls 204, 206, 208 for enabling a user to step through a portion of program code for debugging at a desired pace. The reversible debugging application display 202 further offers controls 210, 212, 214 for stepping through a portion of program code in reverse. For example, a reverse-continue control 210 enables a user to command reversing execution to a particular point in the program code. A reverse-step control 212 enables a user to command the execution be reversed by one instruction of the program code. A reverse-next instruction 214 enables a user to command execution of the program code until a prior event is reached. The reversible debugging application display 202 further provides an execution state information display 216. The execution state information display 216 may provide a variety of data to a user including information regarding a current instruction being executed, a next instruction to be executed, contents of memory locations, and other data. Using the controls 204, 206, 208, 210, 212, 214, the user can work through the execution of the program code, forward and backwards, at a desired pace to view execute state information to help identify any defects in the program code. A user may also be able to execute other commands using the application display 202, such as setting breakpoints within the portion of program code.

Implementing a reversible debugging application provides certain obstacles that are not present in the implementation of a forward-only debugging application. In a forward-only debugging operation, the portion of program code is executed as designed, where all elements (e.g., memory values, register values, open files) needed to execute a next instruction in the program code are set prior to execution of that next instruction in the forward-only debugging application. Thus, it is straightforward for the forward-only debugging application to execute a portion of program code one or more instructions at a time while monitoring system states during that execution.

In contrast, many program code instructions cannot easily be reversed. For example, while the instruction z:=x+y can be easily executed when x and y are known, a debugging application cannot easily reverse the instruction to determine the values of x and y when only z is known. Thus, to implement reversible debugging, a reversible debugging application may need to perform some type of execution state tracking to enable returning to past execution states as commanded by a user.

Figure 3:
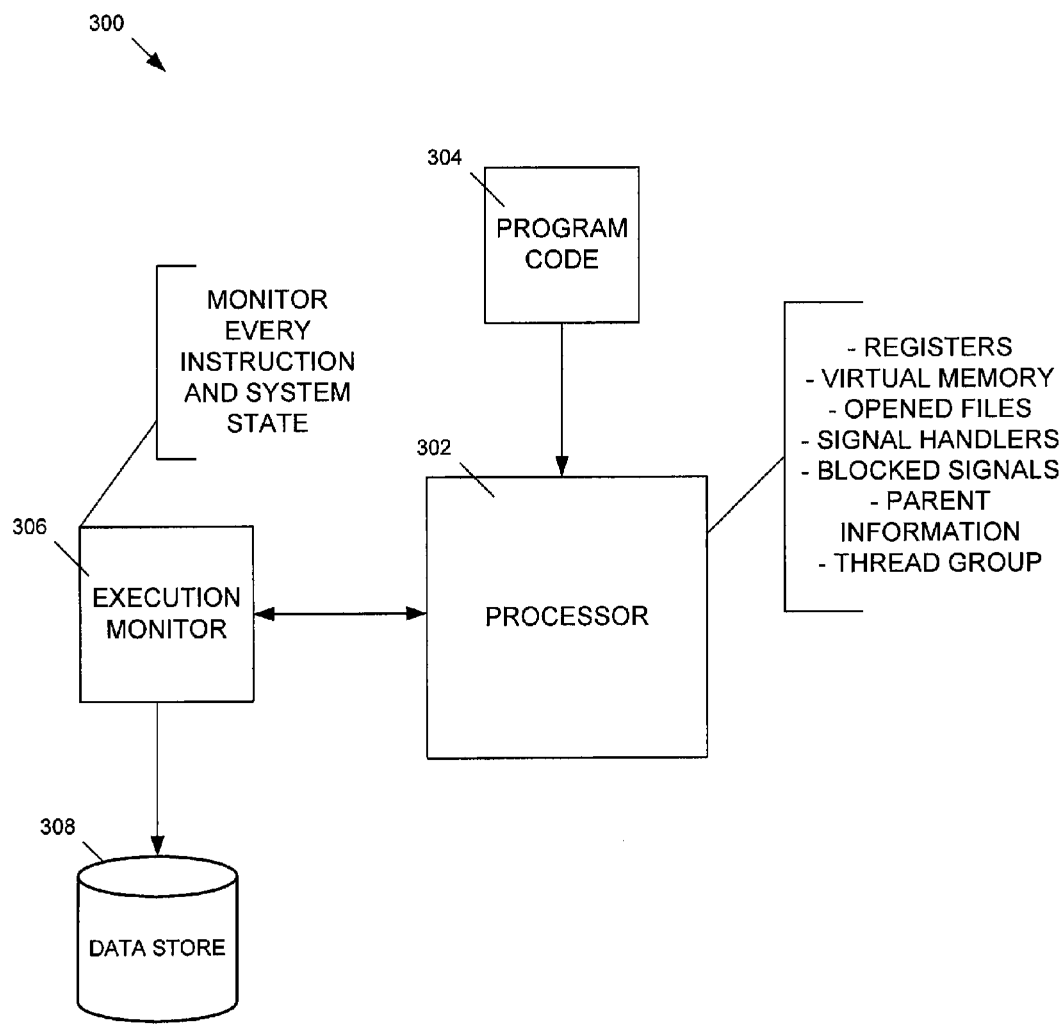
FIG. 3 is a block diagram depicting a first method for implementing execution state tracking.

FIG. 3 is a block diagram depicting a method for implementing execution state tracking. A processor 302 receives program code 304 to be executed for debugging. An execution monitor 306 monitors every instruction executed by the processor 302 and every system state generated in the execution of those instructions. The data captured by the execution monitor 306 may be transmitted for storage in a data store 308. For example, the execution monitor 306 tracks system states for each instruction that is stepped through in a debugging process, such as by using the forward debugging controls in FIG. 2. The execution monitor 306 may track a range of system state data including data values in registers, virtual memory contents, opened files, signal handlers, blocked signals, parent process information, and thread group information. The execution monitor 306 also tracks all intermediate system states generated within execution of single instructions. A user may then maneuver forward and backwards through the tracked system states to debug the program code 304.

The record functionality implemented in FIG. 3 is comprehensive but is resource intensive. Tracking of all system states encountered during execution of the program code 304 may result in execution speeds significantly (e.g., 20,000 times) slower than normal execution. Large amounts of memory may also be necessary to store all of the tracked system states.

Figure 4:
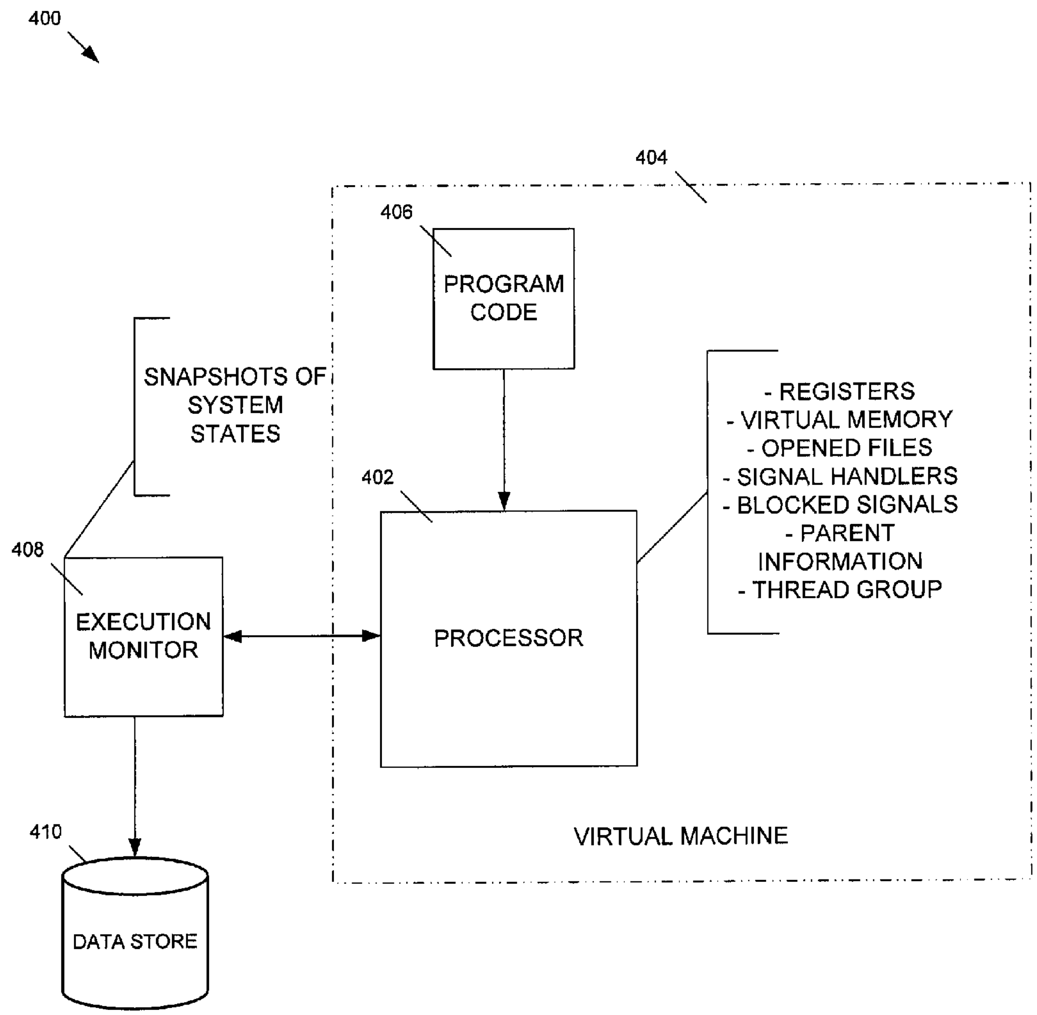
FIG. 4 is a block diagram depicting a second method for implementing execution state tracking.

FIG. 4 is a block diagram depicting a second method for implementing execution state tracking. In the system of FIG. 4, a virtual machine method is used to implement execution state tracking. A virtual machine enables the sharing of underlying physical machine resources between different virtual machines. A virtual machine parcels physical machine resources and allocates those physical machine resources to different virtual machines, enabling a system to provide a logical isolation of different virtual machines. Because a virtual machine is a subset of larger physical machine resources, a virtual machine's execution state can be snooped and monitored.

Thus, in one implementation, a processor 402 of a virtual machine 404 receives and executes program code 406. For example, the processor 402 may execute the program code 406 and track execution state data for later browsing all at one time, or the program code 406 may be stepped through, with execution states tracked, according to user commands. An execution monitor 408 tracks execution states of the virtual machine 404 executing the program code 406. Because the virtual machine 404 is isolated but present within a larger physical system, snapshots of system states may be taken periodically. For example, snapshots of system states may be taken by the execution monitor 408 during execution of the program code 406. The execution monitor 408 may track a range of system state data including data values in registers, virtual memory contents, opened files, signal handlers, blocked signals, parent process information, and thread group information. The storing of those snapshots in a data store 410 enables later traversal of the system states captured in the snapshots in any direction (i.e., forward and backwards).

The virtual machine snapshot method of system state tracking shown in FIG. 4 enables faster execution of the program code 406 during debugging than the comprehensive system state tracking implementation of FIG. 3. However, the virtual machine implementation of FIG. 4 requires a virtual machine to operate. Virtual machine implementations typically require sufficient hardware, specialized software, and significant configuration to ensure proper implementation. Additionally, certain applications that utilize hardware that is not included in a typical virtual machine environment may also not be useable in the virtual machine implementation.

Figure 5:
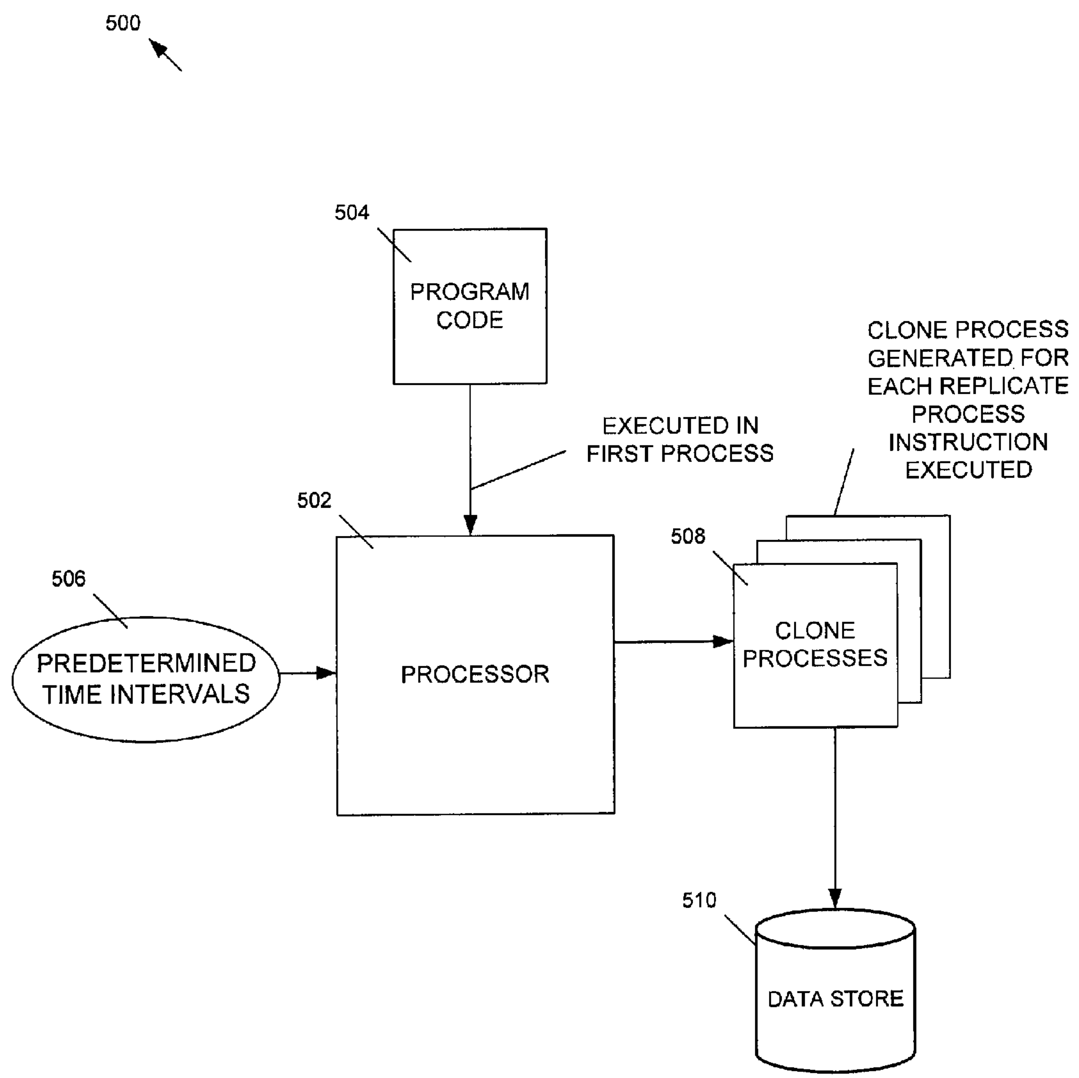
FIG. 5 is a block diagram depicting a reversible debugging application using a replicate process system call.

FIG. 5 is a block diagram depicting a reversible debugging application using a replicate process system call. A processor 502 receives program code 504 for execution and debugging. The program code 504 is executed in a first process by the processor 502. At predetermined time intervals 506, the processor 502 executes a replicate process system call to generate a clone process 508 of a current state of execution of the program code 504. The system call references one or more instructions, such as by calling a function that contains those one or more instructions. Clone processes 508 may be stored in a data store 510 A display may be provided for debugging the program, where the clone processes 508 may be loaded in response to actions taken using the display (e.g., continue, next, reverse-step, reverse next). The display may be configured to enable forward or backward browsing, enabling a user to review states of execution of the program code 504.

The processor 502 may receive a command to execute a replicate process system call in a variety of ways. For example, a process external to the first process that is executing the program code 504 may raise an event to interrupt the processor 502 executing the program code 504 at predetermined time intervals (e.g., every one second). Upon receiving such an event, the processor 502 may execute a replicate process system call to generate a clone process 508 as a second process that mimics the execution state of the first process. The processor 502 may then continue executing the program code in the first process. Alternatively, the processor 502 may continue execution in the second process, because it is a replica of the first process, while state data extraction to generate snapshots is performed using the saved first process.

Figure 6:
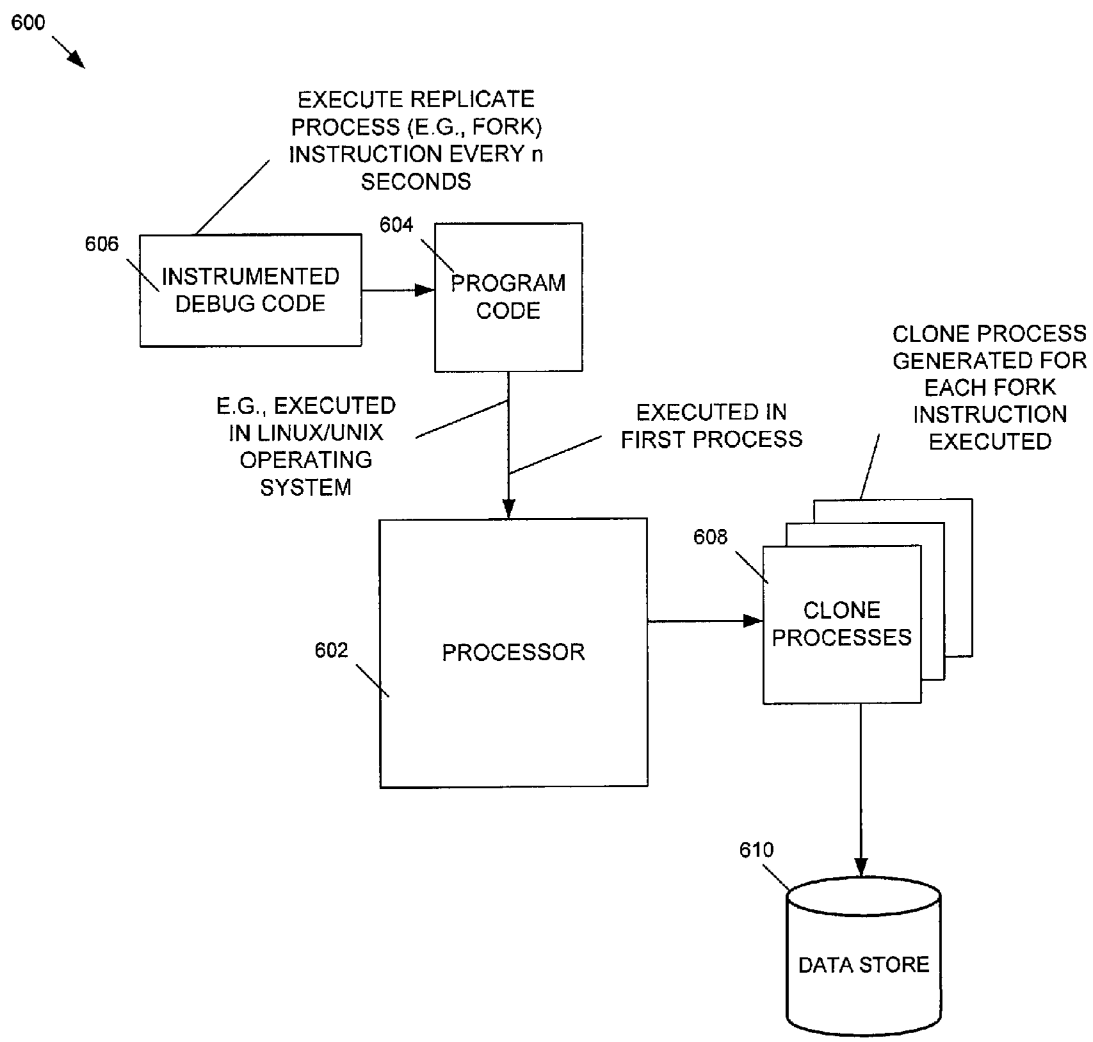
FIG. 6 is a block diagram depicting an example of an implementation of a reversible debugging application using a fork replicate process system call.

FIG. 6 is a block diagram depicting an example of an implementation of a reversible debugging application using a fork replicate process system call. A processor 602 receives program code 604 for execution and debugging. In FIG. 6, the reversible debugging method is executed using an application in a Unix or Linux operating system. The program code 604 is instrumented with certain debug code 606 to instruct the processor when to execute a replicate process system call. For example, debug code 606 may be integrated into the program code 604 to instruct the processor 602 to execute a replicate process system call every one second. Different predetermined time intervals may be used such as 0.01 seconds, 0.1 seconds, 10 seconds, and 1 minute. The duration of the predetermined time intervals may be set by a number of parties including a user performing debugging operations.

In the example of FIG. 6 in a Unix or Linux system, the replicate process system call is a fork system call, which is a native system call of the Unix or Linux system. The fork system call may create a new process that may be a child of the currently executing process. The new process is an exact copy of the currently executing process in many respects. For example, the new, clone process 608 may have identical register contents, virtual memory contents, opened files (e.g., actually files, not shared pointers), signal handlers, blocked signals, parent process information, and thread group information as the currently executing process. The clone process 608 generated for each fork system call executed may be stored in a date store 610.

A fork system call is a native system call of an operating system that is designed to be highly efficient. Thousands of processes may be running in an operating system at any one time. Thus, generating and storing these processes is highly efficient. A reversible debugging method using such a replicate process system call can take advantage of this high execution efficiency and high storage efficiency to minimize slowing of execution issues present in the first reversible debugging method described above with respect to FIG. 3 and without the hardware, software, and configuration burdens of the second debugging method described above with respect to FIG. 4.

Figure 7:
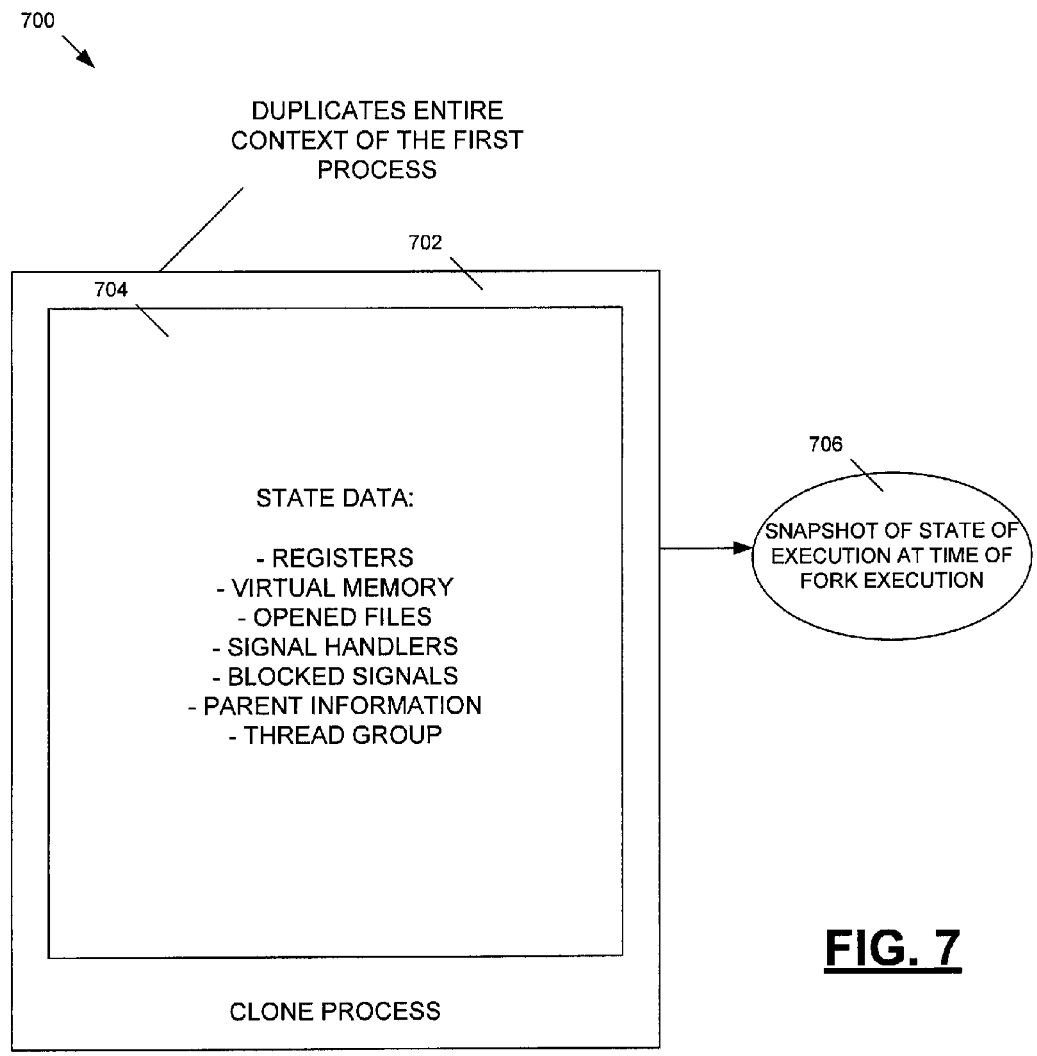
FIG. 7 is a block diagram depicting extraction of state data from the clone processes to generate snapshots of states of execution of the program code at the predetermined time intervals.

FIG. 7 is a block diagram depicting the extracting of state data from the clone processes to generate snapshots of states of execution of the program code at the predetermined time intervals. Each clone process 702 is an exact copy of the currently executing process in many respects. Thus, significant data about the execution state of the currently executing process can be extracted from a clone process. For example, state data 704 including register contents, virtual memory contents, opened files, signal handlers, blocked signals, parent process information, and thread group information can be captured from the clone process 702. This captured state data can be stored as snapshots 706 of the state of execution of program code at the predetermined interval when the replicate process system call (e.g., fork system call) was executed. A display may then be provided of the snapshots for debugging the code.

Figure 8:
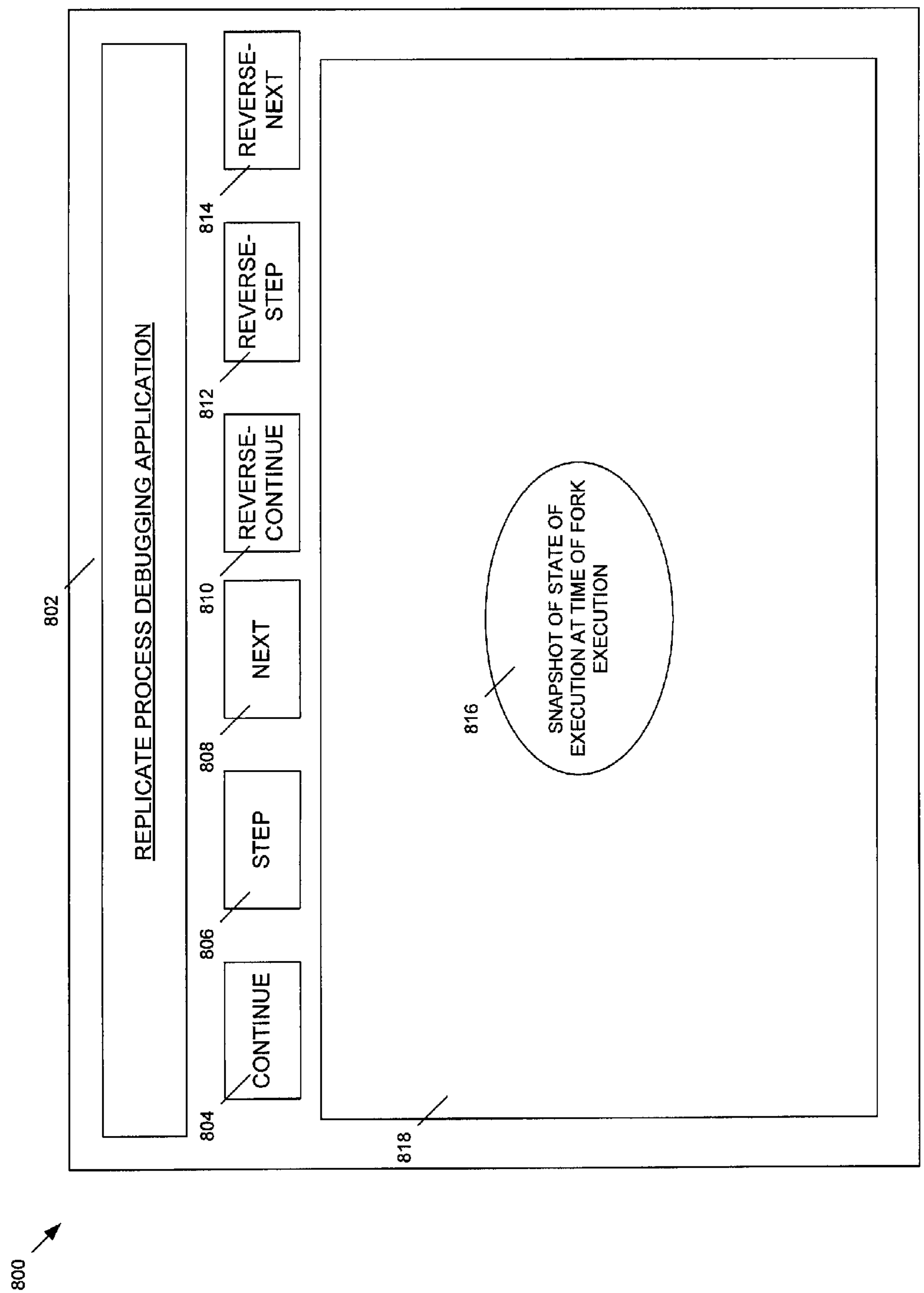
FIG. 8 depicts a replicate process debugging application display.

FIG. 8 depicts a replicate process debugging application display. For example, the replicate process debugging application display 802 offers controls 804, 806, 808 for enabling a user to step through a portion of program code for debugging at a desired pace. The reversible debugging application display 802 further offers controls 810, 812, 814 for stepping through a portion of program code in reverse. For example, a reverse-continue control 810 enables a user to command reversing execution to a particular point in the program code. A reverse-step control 812 enables a user to command the execution be reversed by one instruction of the program code. A reverse-next instruction 814 enables a user to command execution of the program code until a prior event is reached. In response to activation of the replicate process debugging application controls, data from the snapshots 816 may be shown in an execution state information display 818. For example, upon selection of the next control 808, a snapshot 816 associated with the system state after the next event is activated and displayed. As another example, upon selection of a reverse-next control 814, the replicate process debugging application 802 will search for a snapshot which is just earlier than the beginning of the prior event. The replicate process debugging application 802 will switch to the associated process, set a temporary breakpoint at the beginning of that event, and run. The process will then be stopped at the beginning of the event.

Figure 9A:
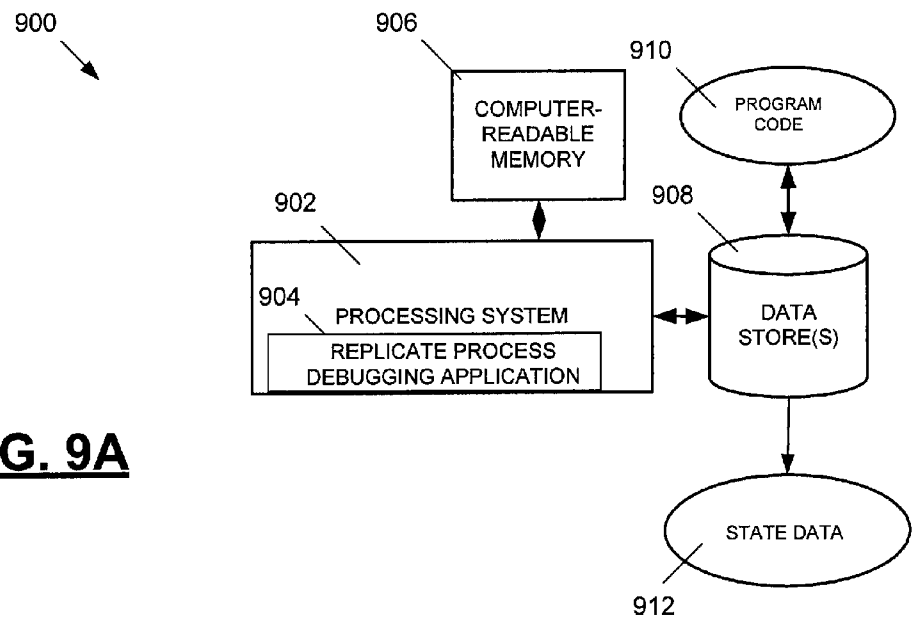
FIGS. 9A, 9B, and 9C depict examples of systems for use in implementing a replicate process debugging application.
Figure 9B:
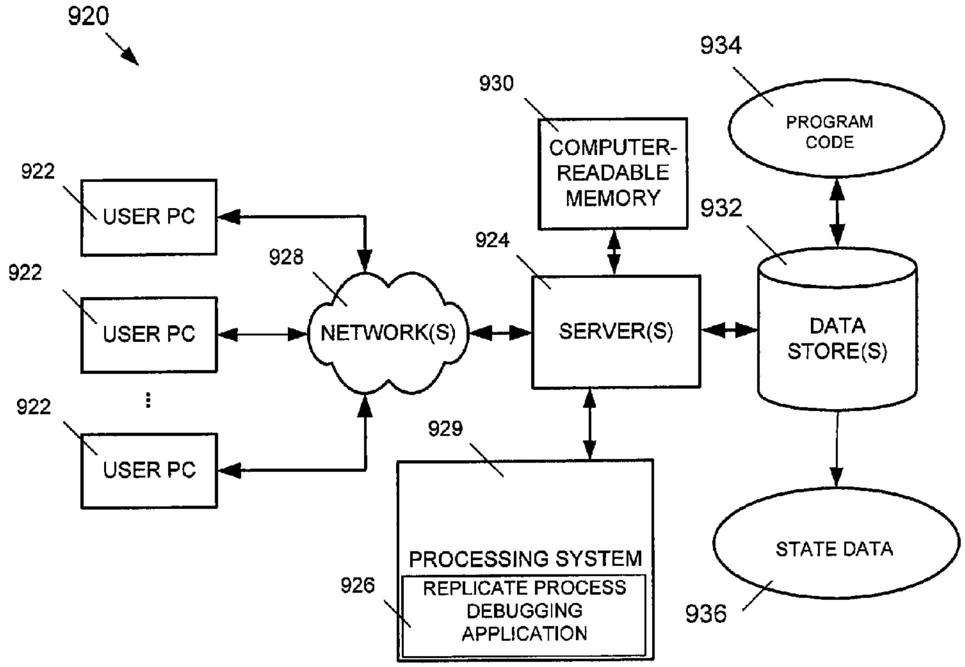
Figure 9C:
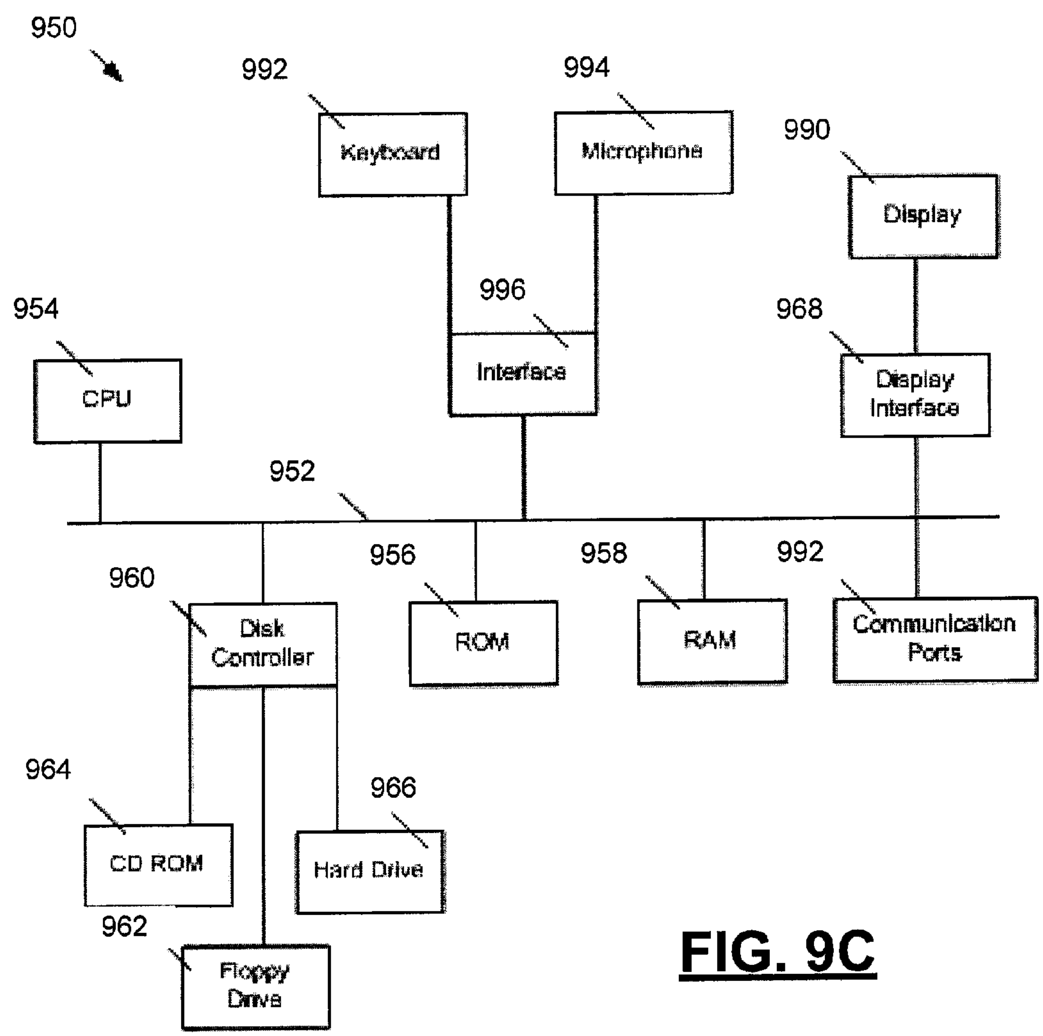

FIGS. 9A, 9B, and 9C depict examples of systems for use in implementing a replicate process debugging application. For example, FIG. 9A depicts an example of a system 900 that includes a stand alone computer architecture where a processing system 902 (e.g., one or more computer processors) includes a replicate process debugging application 904 being executed on it. The processing system 902 has access to a computer-readable memory 906 in addition to one or more data stores 908. The one or more data stores 908 may include program code 910 as well as execution state data 912.

FIG. 9B depicts a system 920 that includes a client server architecture. One or more user PCs 922 access one or more servers 924 running a replicate process debugging application 926 on a processing system 927 via one or more networks 928. The one or more servers 924 may access a computer readable memory 930 as well as one or more data stores 932. The one or more data stores 932 may contain program code 934 as well as execution state data 936.

FIG. 9C shows a block diagram of an example of hardware for a standalone computer architecture 950, such as the architecture depicted in FIG. 9A that may be used to contain and/or implement the program instructions of system embodiments of the present invention. A bus 952 may connect the other illustrated components of the hardware. A processing system 954 labeled CPU (central processing unit) (e.g., one or more computer processors), may perform calculations and logic operations required to execute a program. A processor-readable storage medium, such as read only memory (ROM) 956 and random access memory (RAM) 958, may be in communication with the processing system 954 and may contain one or more programming instructions for performing the method of implementing a replicate process debugging application. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 956 to be displayed on a display 970 in audio, graphic, or alphanumeric format. Communication with external devices may optionally occur using various communication ports 972.

In addition to the standard computer-type components, the hardware may also include data input devices, such as a keyboard 972, or other input device 974, such as a microphone, remote control, pointer, mouse and/or joystick.

Figure 10:
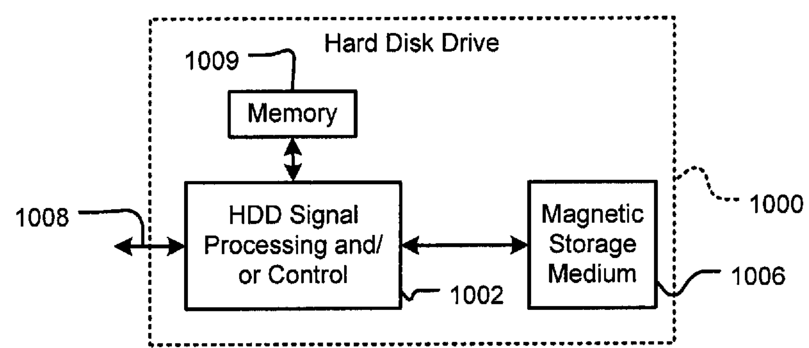
FIG. 10 depicts the present invention embodied in a hard disk drive.

As shown in FIG. 10, the present invention may be embodied in a hard disk drive 1000. In such an embodiment, the present invention may implement either or both signal processing and/or control circuits, which are generally identified in FIG. 10 at 1002. In some implementations, signal processing and/or control circuit 1002 and/or other circuits (not shown) in HDD 1000 may process data, perform coding and/or encryption, perform calculations, and/or format data that is output to and/or received from a magnetic storage medium 1006.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of debugging program code, the computer-implemented method comprising:

executing program code in a process using one or more data processors;

generating clone processes of the process at predetermined time intervals to capture states of execution of the program code at the predetermined time intervals using the one or more data processors;

extracting state data from the clone processes to generate snapshots of execution of the program code at the predetermined time intervals using the one or more data processors; and providing a display of the snapshots for debugging the program code using the one or more data processors, the snapshots including the extracted state data from the clone processes generated at the predetermined time intervals, the display being configured to display extracted state data associated with a particular snapshot of a particular clone process, the display including a control for viewing state data at a preceding event that occurred between a previous clone process and the particular clone process;

upon receiving an interaction with the control, displaying state data at the preceding event by:

locating the previous clone process that is associated with a time before the preceding event;

executing the located previous clone process until occurrence of the preceding event;

extracting and displaying preceding event state data based on the executed previous clone process.

2. The computer-implemented method of claim 1, wherein the clone processes are generated in response to a fork system call.

3. The computer-implemented method of claim 1, wherein the display is configured to enable forward or backward browsing of the snapshots.

4. The computer-implemented method of claim 1, wherein a number of snapshots taken is user-selected.

5. The computer-implemented method of claim 1, wherein a clone process includes registers that contain identical contents as registers of the process at one of the predetermined time intervals.

6. The computer-implemented method of claim 1, wherein a clone process includes virtual memory that contains identical contents as virtual memory of the process at one of the predetermined time intervals.

7. The computer-implemented method of claim 1, wherein a clone process includes open files that include identical contents as open files of the process at one of the predetermined time intervals.

8. The computer-implemented method of claim 2, wherein the computer-implemented method is executed using an application in an operating system, wherein the replicate process system call is a fork system call that is a native system call of the operating system.

9. The computer-implemented method of claim 8, wherein the operating system is Unix or Linux.

10. The computer-implemented method of claim 1, wherein the predetermined time interval is one second in duration.

11. The computer-implemented method of claim 1, wherein clone processes are not generated for one or more states of the execution of the program.

12. The computer-implemented method of claim 1, wherein the computer-implemented method is executed in a non-virtual machine environment.

13. The computer-implemented method of claim 1, wherein each snapshot of the snapshots includes register contents, virtual memory contents, open files, signal handlers, blocked signals, parent information, and a thread group associated with the execution of the program at one of the predetermined time intervals.

14. The computer-implemented method of claim 1, wherein generating the clone process comprises executing a replicate process system call which includes:

generating a second process that mimics the current state of the execution of the program code in the process; and continuing execution of the program code in the second process.

15. A computer-implemented system for debugging program code, the computer-implemented system comprising:

one or more data processors;

a non-transitory computer-readable medium encoded with instructions for commanding the one or more data processors to execute a method, the method comprising:

executing program code in a process using one or more data processors;

generating clone processes of the process at predetermined time intervals to capture states of execution of the program code at the predetermined time intervals using the one or more data processors;

extracting state data from the clone processes to generate snapshots of execution of the program code at the predetermined time intervals using the one or more data processors; and providing a display of the snapshots for debugging the program code using the one or more data processors, the snapshots including the extracted state data from the clone processes generated at the predetermined time intervals, the display being configured to display extracted state data associated with a particular snapshot of a particular clone process, the display including a control for viewing state data at a preceding event that occurred between a previous clone process and the particular clone process;

upon receiving an interaction with the control, displaying state data at the preceding event by:

locating the previous clone process that is associated with a time before the preceding event;

executing the located previous clone process until occurrence of the preceding event;

extracting and displaying preceding event state data based on the executed previous clone process.

16. The computer-implemented system of claim 15, wherein the clone processes are generated in response to a fork system call.

17. The computer-implemented system of claim 15, wherein the display is configured to enable forward or backward browsing of the snapshots.

18. The computer-implemented system of claim 15, wherein a number of snapshots taken is user-selected.

19. A non-transitory computer readable medium encoded with instructions for commanding one or more data processors for executing a method of debugging program code, the method comprising:

executing program code in a process using one or more data processors;

generating clone processes of the process at predetermined time intervals to capture states of execution of the program code at the predetermined time intervals using the one or more data processors;

extracting state data from the clone processes to generate snapshots of execution of the program code at the predetermined time intervals using the one or more data processors; and providing a display of the snapshots for debugging the program code using the one or more data processors, the snapshots including the extracted state data from the clone processes generated at the predetermined time intervals, the display being configured to display extracted state data associated with a particular snapshot of a particular clone process, the display including a control for viewing state data at a preceding event that occurred between a previous clone process and the particular clone process;

upon receiving an interaction with the control, displaying state data at the preceding event by:

locating the previous clone process that is associated with a time before the preceding event;

executing the located previous clone process until occurrence of the preceding event;

extracting and displaying preceding event state data based on the executed previous clone process.

20. The method of claim 1, wherein the located clone process is a first generated clone process that is earlier in time than the preceding event.

* * * * *